「US011337029B2」

(12) United States Patent
Dannenbring et al.

(10) Patent No.: US 11,337,029 B2
(45) Date of Patent: May 17, 2022

(54) MAP BASED FEEDBACK LOOP FOR VEHICLE OBSERVATIONS

(71) Applicant: HERE Global B.V., Eindhoven (NL)

(72) Inventors: Aaron J. Dannenbring, Chicago, IL (US); Sanjay C. Sood, Evanston, IL (US); Vladimir Boroditsky, Northbrook, IL (US)

(73) Assignee: HERE Global B.V., Eindhoven (NL)

( * ) Notice: Subject to any disclaimer, the term of this patent is extended or adjusted under 35 U.S.C. 154(b) by 0 days.

(21) Appl. No.: 16/989,544

(22) Filed: Aug. 10, 2020

(65) Prior Publication Data

US 2020/0374653 A1 Nov. 26, 2020

Related U.S. Application Data

(62) Division of application No. 15/151,685, filed on May 11, 2016, now Pat. No. 10,764,713.

(51) Int. Cl.
| | |
|---|---|
| *H04W 4/02* | (2018.01) |
| *H04W 4/029* | (2018.01) |
| *H04W 4/021* | (2018.01) |
| *G01C 21/32* | (2006.01) |

(Continued)

(52) U.S. Cl.
CPC ............ *H04W 4/023* (2013.01); *G01C 21/32* (2013.01); *G01S 13/06* (2013.01); *G01S 15/06* (2013.01);
(Continued)

(58) Field of Classification Search
CPC ......... G01C 21/32; G01S 13/06; G01S 15/06; G01S 17/06; G06K 9/00818;
(Continued)

(56) References Cited

U.S. PATENT DOCUMENTS

| | | |
|---|---|---|
| 6,853,913 B2 | 2/2005 | Cherveny et al. |
| 8,070,608 B2 | 12/2011 | Uhlir et al. |

(Continued)

FOREIGN PATENT DOCUMENTS

| | | | |
|---|---|---|---|
| CN | 103542860 A | * | 1/2014 |
| DE | 102012220158 A1 | | 5/2014 |

(Continued)

OTHER PUBLICATIONS

European Search Report for related European Application No. 17170389.5 dated Jan. 26, 2018.

(Continued)

*Primary Examiner* — Erica Navar
(74) *Attorney, Agent, or Firm* — Lempia Summerfield Katz LLC

(57) ABSTRACT

Embodiments include apparatus and method for collecting observation data for updating a geographic database. An initial observation is collected by a first mobile device, a first vehicle, or a first sensor. Along with the geographic position, data indicative of the first observation is send to a server. The central server may analyze of the initial observation data to determine if additional observations should be made and define a bounding box from the geographic position of the first mobile device and the analysis of the initial observation data. A request for additional observations is generated and sent to at least one second mobile device, second vehicle, or second sensor based on the bounding box.

18 Claims, 12 Drawing Sheets

(51) Int. Cl.
  *G06T 7/73* (2017.01)
  *G06V 20/58* (2022.01)
  *G01S 13/06* (2006.01)
  *G01S 15/06* (2006.01)
  *G01S 17/06* (2006.01)
  *H04W 84/18* (2009.01)

(52) U.S. Cl.
  CPC ............... *G01S 17/06* (2013.01); *G06T 7/73* (2017.01); *G06V 20/582* (2022.01); *H04W 4/022* (2013.01); *H04W 4/026* (2013.01); *H04W 4/029* (2018.02); *G06T 2207/10004* (2013.01); *G06T 2207/30268* (2013.01); *H04W 84/18* (2013.01)

(58) Field of Classification Search
  CPC . G06T 2207/10004; G06T 2207/30268; G06T 7/73; H04W 4/022; H04W 4/023; H04W 4/026; H04W 4/029; H04W 84/18
  See application file for complete search history.

(56) References Cited

U.S. PATENT DOCUMENTS

| | | | |
|---|---|---|---|
| 8,874,266 B1 | 10/2014 | Francis, Jr. et al. | |
| 8,880,568 B2 | 11/2014 | Perczynski et al. | |
| 9,131,167 B2 | 9/2015 | Regli et al. | |
| 2009/0003298 A1 | 1/2009 | Chu et al. | |
| 2010/0114478 A1 | 5/2010 | Bai | |
| 2010/0328316 A1* | 12/2010 | Stroila | G06K 9/00798 345/441 |
| 2011/0072020 A1 | 3/2011 | Ngo et al. | |
| 2012/0135745 A1 | 5/2012 | Kaplan | |
| 2013/0011017 A1 | 1/2013 | Oh et al. | |
| 2013/0155246 A1 | 6/2013 | Regli et al. | |
| 2015/0019128 A1* | 1/2015 | Weiland | B60W 50/14 701/437 |
| 2015/0046194 A1 | 2/2015 | Waddell et al. | |
| 2015/0141056 A1 | 5/2015 | Fefilatyev et al. | |
| 2015/0154867 A1 | 6/2015 | Tseng et al. | |
| 2017/0105100 A1* | 4/2017 | Farley | H04W 4/029 |

FOREIGN PATENT DOCUMENTS

| | | |
|---|---|---|
| EP | 2299370 A1 | 3/2011 |
| EP | 3016086 A1 | 5/2016 |

OTHER PUBLICATIONS

European Search Report for related European Application No. 17170389.5 dated Oct. 17, 2017.

* cited by examiner

MAP BASED FEEDBACK LOOP FOR VEHICLE OBSERVATIONS

CROSS-REFERENCE TO RELATED APPLICATIONS

This application is a divisional under 35 U.S.C. § 121 and 37 C.F.R. § 1.53(b) of U.S. patent application Ser. No. 15/151,685 filed May 11, 2016, the disclosure of which is incorporated herein by reference in its entirety.

FIELD

The following disclosure relates to observations from a vehicle or other mobile devices for updating geographic databases.

BACKGROUND

Various technologies have been developed that provide navigation-related and map-related services. For example, vehicle navigation systems can determine where a person or a vehicle is located and provide directions to travel to a desired destination. Other navigation-related services may provide other information to mobile users based on the location. Also, internet sites provide maps, directions for traveling to a desired destination from a specified starting point, and other map-related services.

In order to provide these and other map-related functions and features, navigation systems use geographic data. The geographic data may be in the form of one or more geographic databases that include data representing physical features in the geographic region. Sources or updates for the geographic data may be crowdsourced to a fleet of vehicles or other mobile devices for collection.

However, updates have high bandwidth requirements. In addition, some particular mobile devices may be better equipped to collect data than others. Challenges remain in optimizing geographic database updates in light of these considerations.

SUMMARY

In one embodiment, a method for collecting observation data for updating a geographic database includes receiving a geographic position and associated initial observation data from a first mobile device, performing, by a processor, an analysis of the initial observation data, determining, by the processor, a bounding box from the geographic position of the first mobile device, generating a request for additional observations from at least one second mobile device based on the bounding box, and sending the request for additional observations to the at least one second mobile device.

In another embodiment, an apparatus for collecting observation data for updating a geographic database, the apparatus including at least one processor and at least one memory including computer program code for one or more programs, the at least one memory and the computer program code configured to, with the at least one processor, cause the apparatus to at least perform identifying a geographic position and associated initial observation data from a first mobile device, determining a bounding box or road segment from the geographic position of the first mobile device and the initial observation data, identifying at least one approaching vehicle associated with the bounding box or road segment, and sending a request for additional observations to at least one second mobile device based on the bounding box and the approaching vehicle.

In another embodiment a method includes detecting, by position circuitry, a geographic position of a mobile device, detecting initial observation data from a first sensor, performing an analysis of the initial observation data, wherein the analysis includes a code for a road object, sending the code for the road object and the geographic position to a server, wherein a bounding box for additional observations is defined from the geographic position of the first mobile device and the analysis of the initial observation data, receiving a request for additional observations from the server, setting a collection flag in response to the request, wherein the collection flag is configured to be deleted in response to time, distance, or collection fulfillment by another mobile device, and detecting additional observation of data from a second sensor.

In another embodiment, an apparatus includes position circuitry, a sensor, a controller, and a communication interface. The position circuitry is configured to detect a geographic position of a mobile device. The sensor is configured to detect initial observation data. The controller is configured to perform an analysis of the initial observation data. The analysis includes a code for a road object. The communication interface configured to send the code for the road object and the geographic position to a server, and a bounding box for additional observations is defined from the geographic position of the first mobile device and the analysis of the initial observation data.

BRIEF DESCRIPTION OF THE DRAWINGS

Exemplary embodiments of the present invention are described herein with reference to the following drawings.

DETAILED DESCRIPTION

A connected vehicle includes a communication device and an environment sensor array. The connected vehicle may include an integrated communication device coupled with an in-dash navigation system. The connected vehicle may include an ad-hoc communication device such as a mobile device or smartphone in communication with a vehicle system. The communication device connects the vehicle to a network including at least one other vehicle and at least one server. The network may be the internet or connected to the internet.

The sensor array may include one or more sensors configured to detect the position of the vehicle, the speed and direction of the vehicle, and/or the surroundings of the vehicle. The sensor array may include multiple sensors. Example sensors include an optical distance system such as light detection and ranging (LiDAR), an image capture system such as a camera, a sound detection system such as sound navigation and ranging (SONAR), a radio detection system such as radio detection and ranging (RADAR) or another sensor. The camera may be a visible spectrum camera, an infrared camera, an ultraviolet camera or another camera. Multiple cameras may be included such as a low definition camera and a high definition camera.

Data collected by the sensor array may update or supplement a geographic database. A geographic database includes road links or road segments and nodes associated with locations. The databases may also include other attributes of or about the roads such as, for example, geographic coordinates, street names, address ranges, speed limits, turn restrictions at intersections, and/or other navigation related attributes. The geographic database may include the location of stop signs and/or stoplights along the road segments, as well as points of interest (POIs).

Different vehicles may have different types sensors or sensors with different capabilities. A first group of vehicles may have low quality sensors, and a second group of vehicles includes high quality sensors. The low quality sensors may be capable of collecting data on road adjacent objects to identify that a change has occurred but not of a high enough quality to update the geographic database. It is not efficient to have every possible vehicle collect and send data to a central management device at all times. The central management device may coordinate the collection efforts of the vehicles.

The following embodiments include example devices and algorithms for the coordination of data collection vehicles or mobile devices. The central management device may use multiple factors in determining a subset of data collection vehicles or mobile devices. The multiple factors may include the capabilities of individual data collection systems, the direction of travel of the data collection system, and/or other factors.

Figure 1:
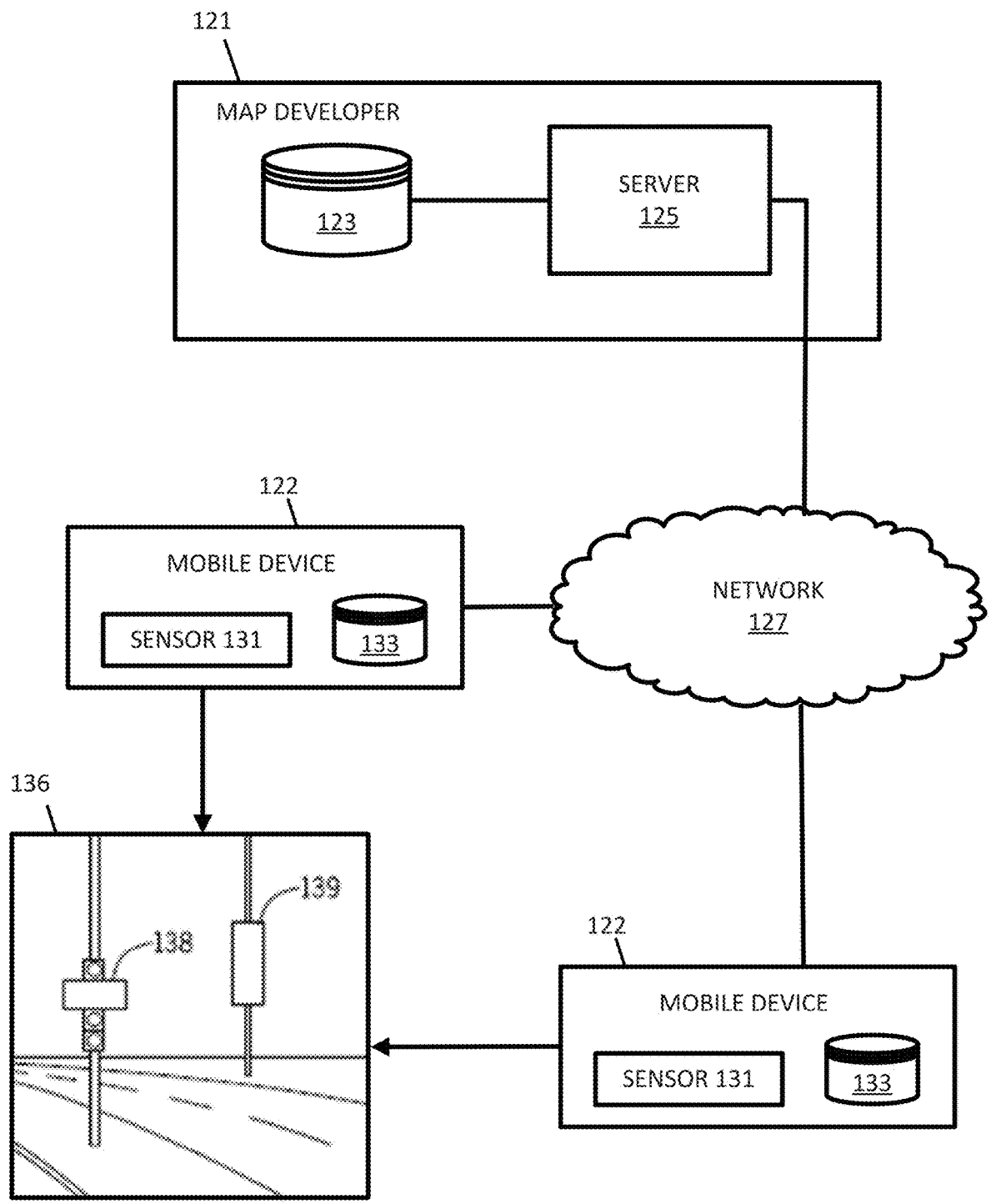
FIG. 1 illustrates an example system for providing feedback for vehicle observations.

FIG. 1 illustrates an example system for providing feedback for vehicle observations. In FIG. 1, one or more mobile device 122 include sensors 131 and are connected to the server 125 though the network 127. The sensors 131 are configured to detect one or more road objects (e.g., stoplight 138 or sign 139) in roadway scene 136. A database 123, including the geographic database and map, is also connected to the server 125. The database 123 and the server 125 make up a developer system 121. Multiple mobile devices 122 may be connected to the server 125 through the network 127. The mobile devices 122 include databases 133 corresponding to a local map. The mobile device 122 may be standalone device such as smartphones or devices integrated with vehicles. Additional, different, or fewer components may be included.

In addition or in the alternative to stoplight 138 or sign 139, road objects may include any object that are detectable from the roadway. Road objects may include road furniture related to the movement of traffic along a roadway. Example road furniture items include any traffic signs, any traffic lights, crosswalks, transit stops, road barriers, or other physical items that include information on the flow of traffic along the roadway. In one example, road objects such as these road furniture items are permanent or semi-permanent and do not typically change over time. Other road objects may include transient or semi-transient objects. Examples of transient or semi-transient objects include hazards such as accidents, potholes, stalled vehicles, or foreign objects. Examples of transient or semi-transient objects include construction zones, mowing crews, moving roadblocks, or emergency vehicles. Transient or semi-transient objects may also be represented by signage or other road furniture such as a road construction sign or flashing light.

Figure 2:
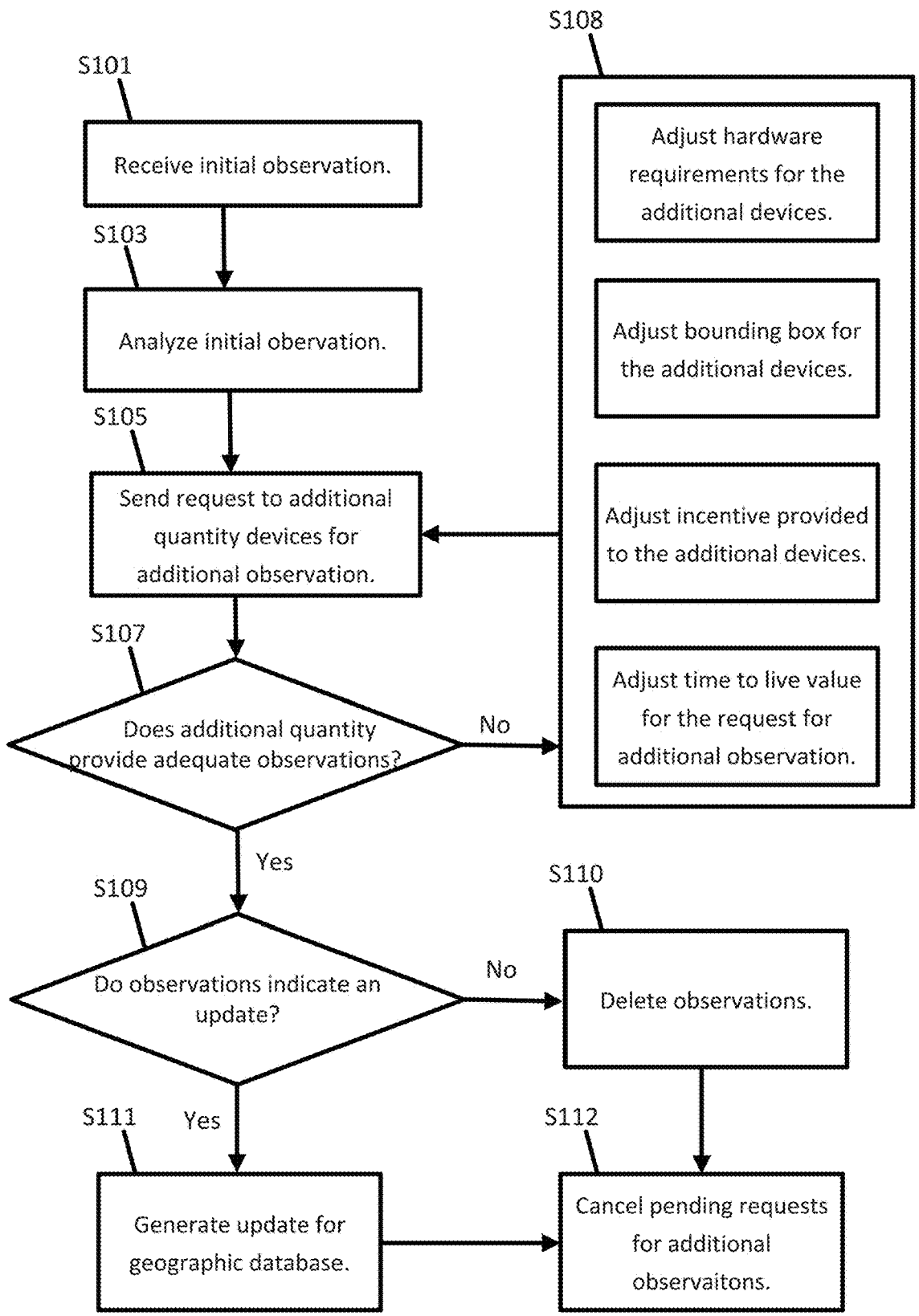
FIG. 2 illustrates a flowchart for the system of FIG. 1.

FIG. 2 illustrates a flowchart for the system of FIG. 1. The stated acts in the flowchart may be performed by server 125. However, some acts may alternatively be performed by mobile device 122 or another device. Additional, different, or fewer acts may be included.

At act S101, the initial observation of a road object is received. The initial observation may have a predetermined size with respect to a number of bytes or a bandwidth for communicating the initial observation from the mobile device 122 to the network 127. The initial observation may be a result of image processing performed at the mobile device 122. Image processing techniques applied to the camera image may include edge detection or feature transform (e.g., scale-invariant feature transform (SIFT)). The image processing technique may utilize feature vectors. For example, a library of feature vectors from possible expected template may be compared to a set of feature vectors calculated from the collected image.

The initial observation may include a text string of data that describes an attribute of the road object determined as a result of the image processing. An example of a text string may be "55 mph" for a speed limit sign, "no left turn," or "do not pass," for textual signs, which include text optically recognized directly from the image of the sign. An example of a text string may be "slippery when wet," "lane ends," "hill," or "divided highway," which are text strings that represent a graphical icon on a sign recognized from the image processing. In any of these examples, a numerical or alphanumerical code may represent the sign (e.g., S1 for no left turn sign, or S2 for do not pass sign) or represent the type of road object (e.g., T1 for sign, or T2 for obstacle).

The initial observation may also include a geographic position (e.g., coordinates such as latitude, longitude, and/or altitude) of the mobile device 122 from which the observation was made. The initial observation may be a code for the detected object concatenated with a code for the geographic position. The sensors 131 may include a global positioning system (GPS) or another position sensor. The initial observation may also include a heading describing the direction of the mobile device 122 at the time of the initial observation. In some example, the heading may be incorporated into a vector describing the distance of the initial observation from the mobile device 122.

At act S103, the initial observation is analyzed. The analysis may involve comparing the position of the initial observation to the geographic database 123. When the initial observation includes the type of road object, the server 125 determines whether the type of road object is already included in the geographic database 123 at the position or within a predetermined distance range of the position. When the road object is already stored in the geographic database 123, the server 125 determines that additional observations are needed to confirm or further investigate the initial observation.

In some examples, the server 125 may also analyze the attribute of the road object of the initial observation. When the initial observation includes a value of an attribute of the road object, the server 125 determines whether the value is different than the value for the road object previously stored in the geographic database 123. When the road object is already stored in the geographic database 123, the server 125 determines that additional observations are needed to confirm or further investigate the initial observation.

Figure 3:
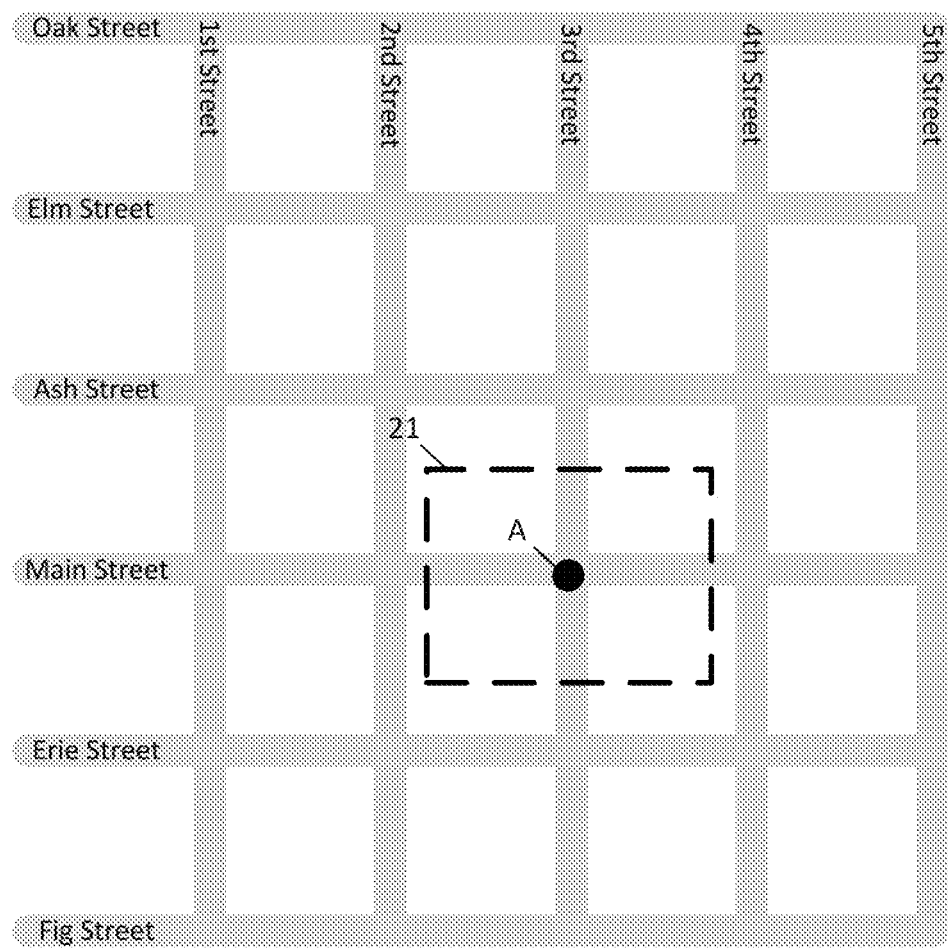
FIG. 3 illustrates an example bounding box for requesting vehicle observations.

At act S105, a request for additional observations is sent to one or more additional devices. The server 125 may have a default setting to send the requests to a predetermined quantity of mobile devices 122 in proximity to the geographic location of the initial observation. The default quantity of additional devices may be a predetermined number (e.g., the closest X number of devices) or a set geographic area or radius from the initial observation. The quantity of additional devices may depend on a size of a bounding box defining in proximity to the geographic location. Examples for the bounding box include a predetermined distance defining a radius of a circle or length of a rectangle. FIG. 3 illustrates an example bounding box 21 for requesting vehicle observations near initial observation or initial vehicle A. The bounding box 21 is illustrated on a map including a grid of streets.

The server 125 may send the requests for additional information to mobile devices 122 that are currently traveling in the bounding box 21 (e.g., mobile device 122 reporting positions in the bounding box 21) or headed toward or approaching bounding box 21 (e.g., mobile device 122 reporting a series of positions or a route leading to the bounding box 21). That is, one or more vehicles or mobile devices may be identified by direction of travel toward the bounding box 21, or associated road link ID. These vehicles may not yet be within the bounding box 21 area or on the road segment of the associated road link ID. The direction of travel and speed may be factors in identifying these vehicles. The approaching vehicles may be identified as those vehicles within a distance threshold to the bounding box 21. For example, there can be many vehicles going in the direction of the bounding box, but only the approaching vehicles that are like the predetermined distance (e.g., 1 mile) from a border of the bounding box or road segment are identified for act S105.

The size of the default bounding box 21 may be set according to the quantity of mobile devices 122. As described in the following acts, the size of the bounding box 21 may be dynamic.

The request for additional observations may include a command to add a collection flag for one or more mobile device 122 in receipt of the request. The collection flag may include a designation of the type of sensor that should be instructed to collect data observations at or near the geographic position of the initial observation. Thus, in response to the command and/or the collection flag, the mobile device 122 is configured to collect additional observation data based on the geographic position of the initial observation.

The collection flag may include a time to live value. The time to live value is a countdown time period (e.g., 10 minutes or 1 hour) or an expiration time and date that causes the collection to be erased from memory. The time to live value may be selected proportionately to the size of the bounding box and/or the level of traffic in the bounding box. As compared to two commands, one command to initiate the collection flag and another to remove the collection flag, the time to live value reduces bandwidth between the mobile device 122 and the server 125.

The collection flag may be self-deleting in other ways. For example, when the mobile device 122 travels more than a predetermined distance away from the bounding box, the collection flag may be erased from memory. In other examples, when the vehicle or mobile device 122 is turned off or stops moving for a predetermined time (e.g., 10 minutes or overnight), the collection flag is erased from memory. The collection flag may be deleted after the mobile device 122 travels a predetermined distance, or a predetermined distance from where the collection flag was received. The collection flag may be deleted in response to fulfillment by another mobile device. That is, when another mobile device has collected data to fulfil the request for additional observation, the server 125 may send an instruction to mobile device 122 to clear the collection flag.

The additional observations received at the server 125 in response to the requests may be associated with geographic positions determined by the position sensor. The additional observations may also include a heading describing the direction of the mobile device 122 at the time of the additional observations. In some examples, the heading may be incorporated into a vector describing the distance of the additional observations from the mobile device 122.

The collection flag also may specify a particular sensor or sensor type for the additional observations. The additional observations may be high bandwidth observations as compared to the initial observation. As the initial observation may include only a few bytes or less than a kilobyte as a sequence or code describing the road object or an attribute of the road object, the additional observations may include a detailed description of the area around the vehicle. The additional observations may include an image from a camera, LiDAR data, SONAR data, or RADAR data. The additional observations may include data in excess of one kilobyte of data or one to several megabytes of data. The additional observations may be transmitted over a high bandwidth communication path (e.g., Wifi) and the initial observation may be transmitted over a low bandwidth communication path (e.g., cellular).

At act S107, the server 125 determines whether the additional observations in S105 are adequate to identify the road object or characteristic in question. This determination may be based on the number of mobile device 122 or vehicles, or qualified vehicles, currently in the bounding box 21 or headed toward the bounding box 21.

Qualified vehicles may be vehicles equipped to report observation data to the server 125. For example, when the mobile device 122 is incorporated into the vehicle, only certain manufacturers may be configured for communication with the server 125. The qualified vehicles may correspond to vehicles that subscribe to map updates from the server 125. When the mobile device 122 is a standalone device, qualified vehicles may include mobile device 122 with a particular mobile application installed or running.

At act S108, when the additional observations are not adequate or the quantity of vehicles in the bounding box 21 is less than the threshold, one or more adjustments are made to improve the data collection in act S105.

In one example in act S108, the adjustments include adjusting the hardware requirements for the additional devices in act S105. For example, the mobile devices 122 may be classified according to the hardware of the mobile device 122 or associated vehicle. In one example, the hardware classifications are based on the type of available sensors. Low quality vehicles of mobile devices 122 may include only a low definition camera. Medium quality vehicles of mobile devices 122 may include at least a high definition camera. High quality vehicles of mobile devices 122 may include only optical distancing sensors such as LiDAR. In some examples, the hardware classifications may be based on the type of communication with the network 127. When more vehicles are needed for the additional observations in the bounding box 21, the hardware requirements for the mobile devices 122 that are sent requests may be lowered (e.g., high quality to medium quality, medium quality to low quality, or high quality to low quality).

Figure 4:
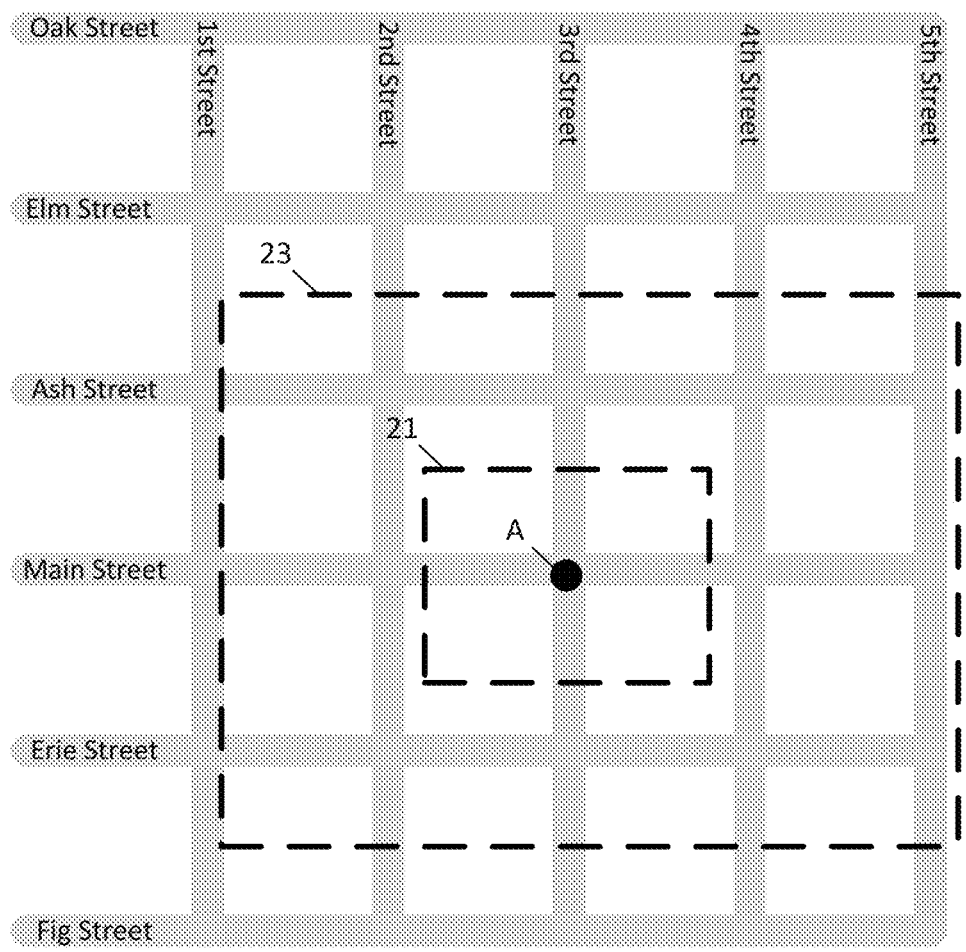
FIG. 4 illustrates an example variable bounding box for requesting vehicle observations.

In one example in act S108, the adjustments include adjusting a bounding box 21 for selecting the additional devices in act S105. In order to increase the quantity of vehicles in the bounding box, the server 125 may increase the size of the bounding box. FIG. 4 illustrates an example variable bounding box for requesting vehicle observations to bounding box 23. The center of the increased bounding box 23 may be constant with initial observation or initial vehicle A. In one example, the bounding box size (e.g., circle radius or rectangle side length) is increased to include a specific number of vehicles.

Figure 5:
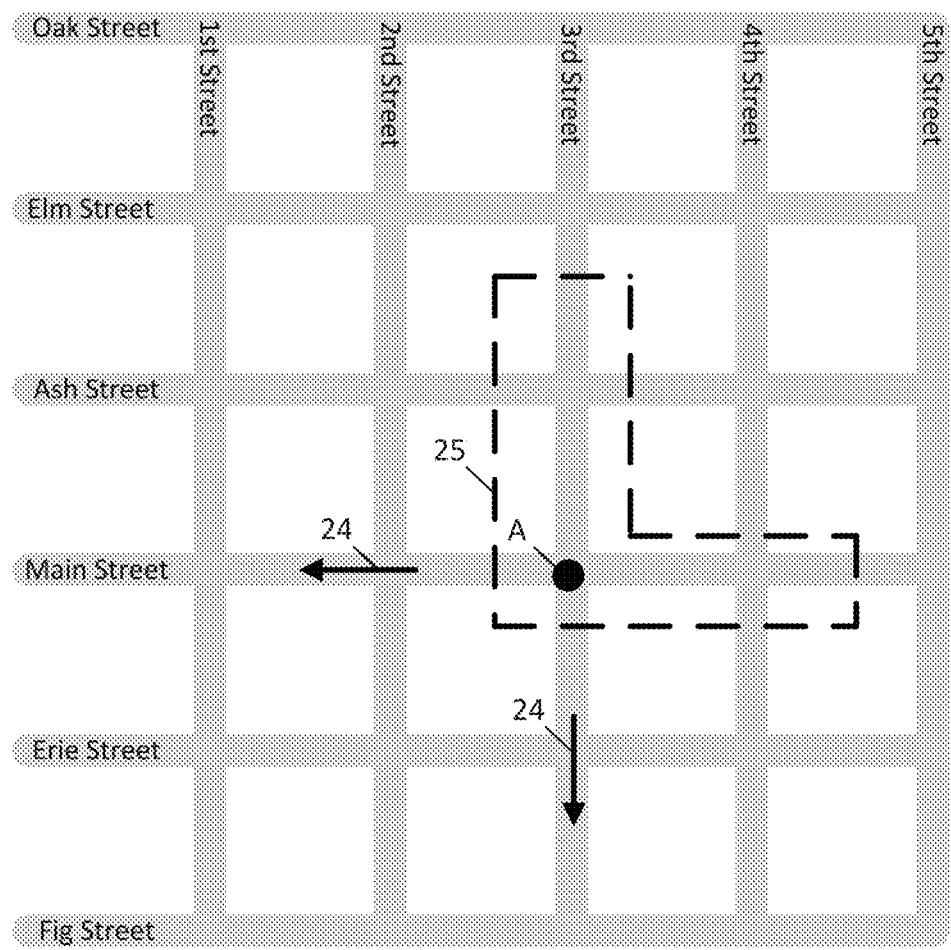
FIG. 5 illustrates an example directional bounding box for requesting vehicle observations.

In another example, the size of a bounding box 25 may be adjusted directionally, as illustrated by FIG. 5. The size of the bounding box 25 depends on the direction of travel of one or more one-way road segments (i.e., one-way direction indicated by arrows 24) or road links in the geographic database 123 in proximity of the initial observation or initial vehicle A. The bounding box 25 is extended in a direction opposite to the direction of travel of one way segments. The bounding box 25 is extended farther upstream of road segments Main Street and $3^{rd}$ Street than downstream, as illustrated in FIG. 5. The bounding box 25 may be sized according to speed limit of road segments including in the bounding box 25. Dimensions of the bounding box 25 that coincide with higher speed limit road segments may have a greater length than dimensions of the bounding box that coincide with lower speed limits.

Figure 6:
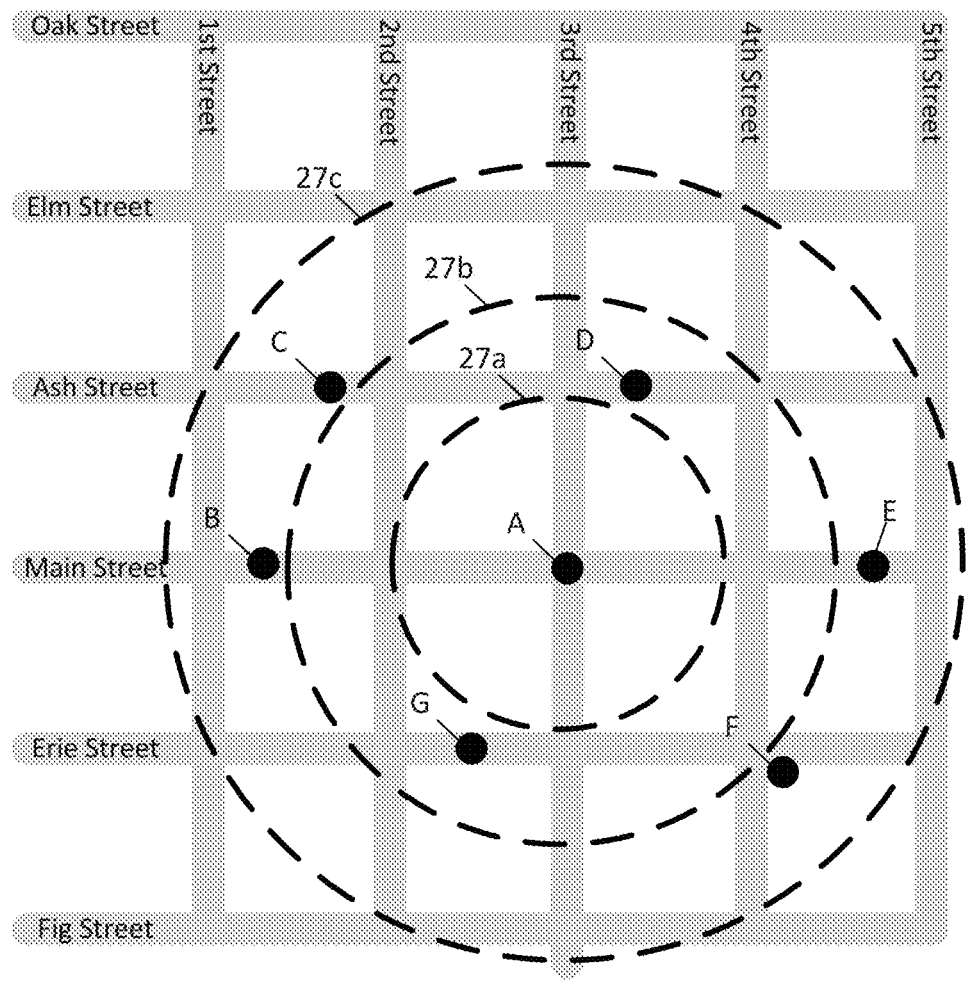
FIG. 6 illustrates an example subset of vehicles for requesting vehicle observations.

FIG. 6 illustrates an example subset of vehicles for requesting vehicle observations. The size of the bounding box may be adjusted radially. For example, when the bounding box 27a is set to a default radius from initial observation A, no qualified vehicles are included in the bounding box 27a. The bounding box 27a may be extended radially to bounding box 27b to include vehicles or mobile devices D and G. However, when D and G are not qualified vehicles, do not meet hardware requirements, or do not travel toward the initial observation A, the bounding box 27b may be extended to bounding box 27c. Bounding box 27c includes vehicles or mobile devices B, C, E, and F, increasing the probability that adequate observations are received.

Figure 7:
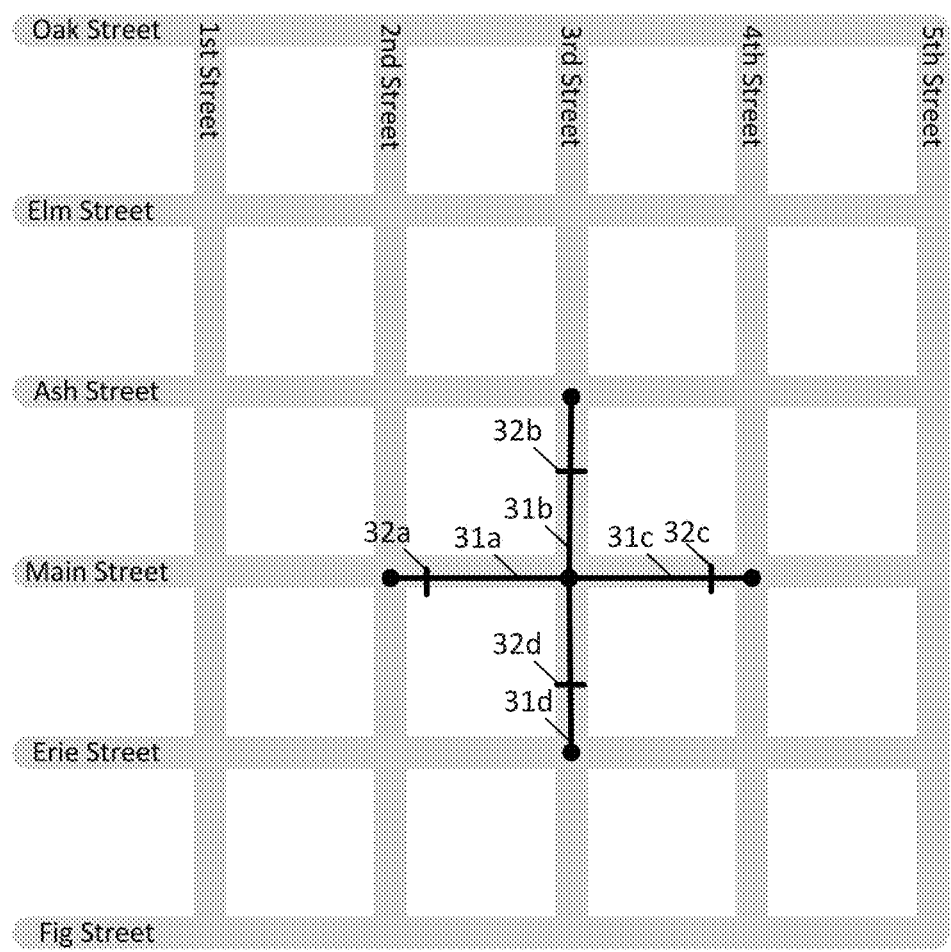
FIG. 7 illustrates an example boundary defined by link offsets.

FIG. 7 illustrates an example boundary defined by link offsets. In preceding embodiments, the bounding boxes were defined according to geographic coordinates (e.g., latitude and longitude) or map tile coordinates. The bounding boxes may also be described by road segments or road link offsets. That is, each vertex or edge forming the bounding box may be defined by a specific relative position along a road link. The example shown in FIG. 7 includes road segments 31a-d and respective offsets 32a-d. The offset may be a fractional or decimal value that defines a point as a proportional distance how far along the road segment, as shown in Table 1. The proportion value may be measured from the beginning of the road segment to the end of the road segment. In one example, the bounding box is formed by connecting the offsets to form a closed polygon. In another example, the road segments are extended perpendicular to the respective road segments to form a polygon. The example, shown in FIG. 7 results in the rectangular bounding box 21 of FIG. 3.

TABLE 1

| Road Segment | Offset |
|---|---|
| 31a | 0.8 |
| 31b | 0.6 |
| 31c | 0.2 |
| 31d | 0.4 |

As an alternative, the bounding box is omitted and only road link IDs are used. For example, if a vehicle is approaching a road link, then that vehicle or associated mobile device is identified and is instructed capture data when traveling on that road link (or an offset point along that road link).

In one example in act S108, the adjustments include adjusting an incentive provided to the additional devices in act S105. Various types of incentives may be provided to the vehicles that provide observation data to the server 125.

In one example, the incentive system is invisible to the user or driver. The vehicle may be equipped with a manufacturer system that automatically provides observations of the surroundings of the vehicle when requested or at certain positions. In this case, the incentive may be related to the availability of map updates or costs of map updates to the manufacturer.

In another example, the incentive system may interact with the driver or user. The driver may activate the option to collect and send observations to the map provider in order to receive map updates in exchange at no cost or a lower cost. The reduction in costs may be calculated based on the number of useful observations provided by the particular user.

In one example in act S108, the adjustments include adjusting a time to live value associated with the request sent to the additional devices in act S105. The vehicles or mobile devices 122 delete the collection flag and stop reporting observations when the time to live value for the collection value expires. In some instances, the time to live value may be expiring before adequate time has passed to make the additional observations. This may be because of traffic or because a larger bounding box is being used. The server 125 may increase the time to live value to achieve more observations.

After one or more of these techniques for increasing the number of vehicles making additional observations or improvement the quality of additional observations by reducing the number of vehicles making additional observations, the sequence loops back to act S105 for the collection of additional observations. In this way the process includes a feedback loop for vehicle observations.

At act S109, when the additional observations are adequate, the server 125 determines whether the observations indicate that an update should be made to the geographic database 123. The update may be made when the observation includes information not already included in the geographic database 123. In another example, a confidence level may be tracked. The confidence level may be increased each time one of the additional observation detects a particular road object or road object attribute. The increment of the confidence level may depend on the reliability of the sensor. Different sensor types may be assigned different reliability scaling factors. When the confidence level exceeds a threshold, the geographic database 123 is updated.

Some updates may be ignored. For example, the server 125 may apply a feasibility test to the observation. For example, if the observation indicates that the speed limit posted is 100 mph, but no speed limits in the geographic area exceed 70 mph, the observation may fail the feasibility test and the server 125 may ignore the observation.

At act S111, when an update is needed, the server 125 generates an update for the geographic database 123. The update may be distributed to vehicles or mobile device 122 according to a schedule or upon request.

At act S110, when no update is needed, the server 125 may delete or flag for deletion the observations. At S112, the server 125 may cancel pending requests for additional observations. That is, the server 125 may have sent out multiple requests in act S105. When the additional observations provide enough information to determine conclusively whether or not an update is needed, other pending requests that are still valid are no longer needed.

The mobile device 122 may be a personal navigation device ("PND"), a portable navigation device, a mobile phone, a personal digital assistant ("PDA"), a watch, a tablet computer, a notebook computer, and/or any other known or later developed mobile device or personal computer. The mobile device 122 may also be an automobile head unit, infotainment system, and/or any other known or later developed automotive navigation system. Non-limiting embodiments of navigation devices may also include relational database service devices, mobile phone devices, car navigation devices, and navigation devices used for air or water travel.

Communication between the mobile device 122 and the server 125 through the network 127 may use a variety of types of wireless networks. Example wireless networks include cellular networks, the family of protocols known as WiFi or IEEE 802.11, the family of protocols known as Bluetooth, or another protocol. The cellular technologies may be analog advanced mobile phone system (AMPS), the global system for mobile communication (GSM), third generation partnership project (3GPP), code division multiple access (CDMA), personal handy-phone system (PHS), and 4G or long term evolution (LTE) standards, or another protocol.

Figure 8:
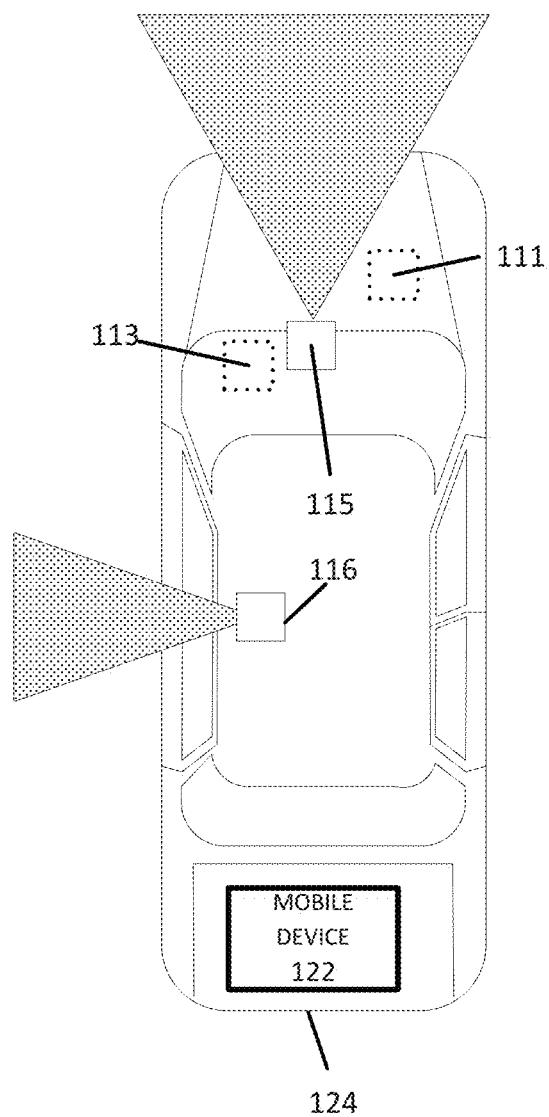
FIG. 8 illustrates an example connected vehicle.

FIG. 8 illustrates an example connected vehicle 124. A connected vehicle includes a communication device and an environment sensor array as sensor 131 for reporting the surroundings of the vehicle 124 to the server 125. The connected vehicle may include an integrated communication device coupled with an in-dash navigation system. The connected vehicle may include an ad-hoc communication device such as a mobile device or smartphone in communication with a vehicle system. The communication device connects the vehicle to a network including at least one other vehicle and at least one server. The network may be the Internet or connected to the internet.

The sensor array may include one or more sensors configured to detect surroundings of the vehicle. The sensor array may include multiple sensors. Example sensors include an optical distance system such as light detection and ranging (LiDAR) 116, an image capture system 115 such as a camera, a sound distance system such as sound navigation and ranging (SONAR), a radio distancing system such as radio detection and ranging (RADAR) or another sensor. The camera may be a visible spectrum camera, an infrared camera, an ultraviolet camera or another camera.

The vehicles 124 may include a global positioning system, a dead reckoning-type system, cellular location system, or combinations of these or other systems, which may be referred to as position circuitry or a position detector. The positioning circuitry may include suitable sensing devices that measure the traveling distance, speed, direction, and so on, of the mobile device 122. The positioning system may also include a receiver and correlation chip to obtain a GPS signal. Alternatively or additionally, the one or more detectors or sensors may include an accelerometer built or embedded into or within the interior of the mobile device 122.

In some alternatives, additional sensors may be included in the vehicle 124. An engine sensor 111 may include a throttle sensor that measures a position of a throttle of the engine or a position of an accelerator pedal, a brake senor that measures a position of a braking mechanism or a brake pedal, or a speed sensor that measures a speed of the engine or a speed of the vehicle wheels. Another additional example, vehicle sensor 113, may include a steering wheel angle sensor, a speedometer sensor, or a tachometer sensor.

Figure 9:
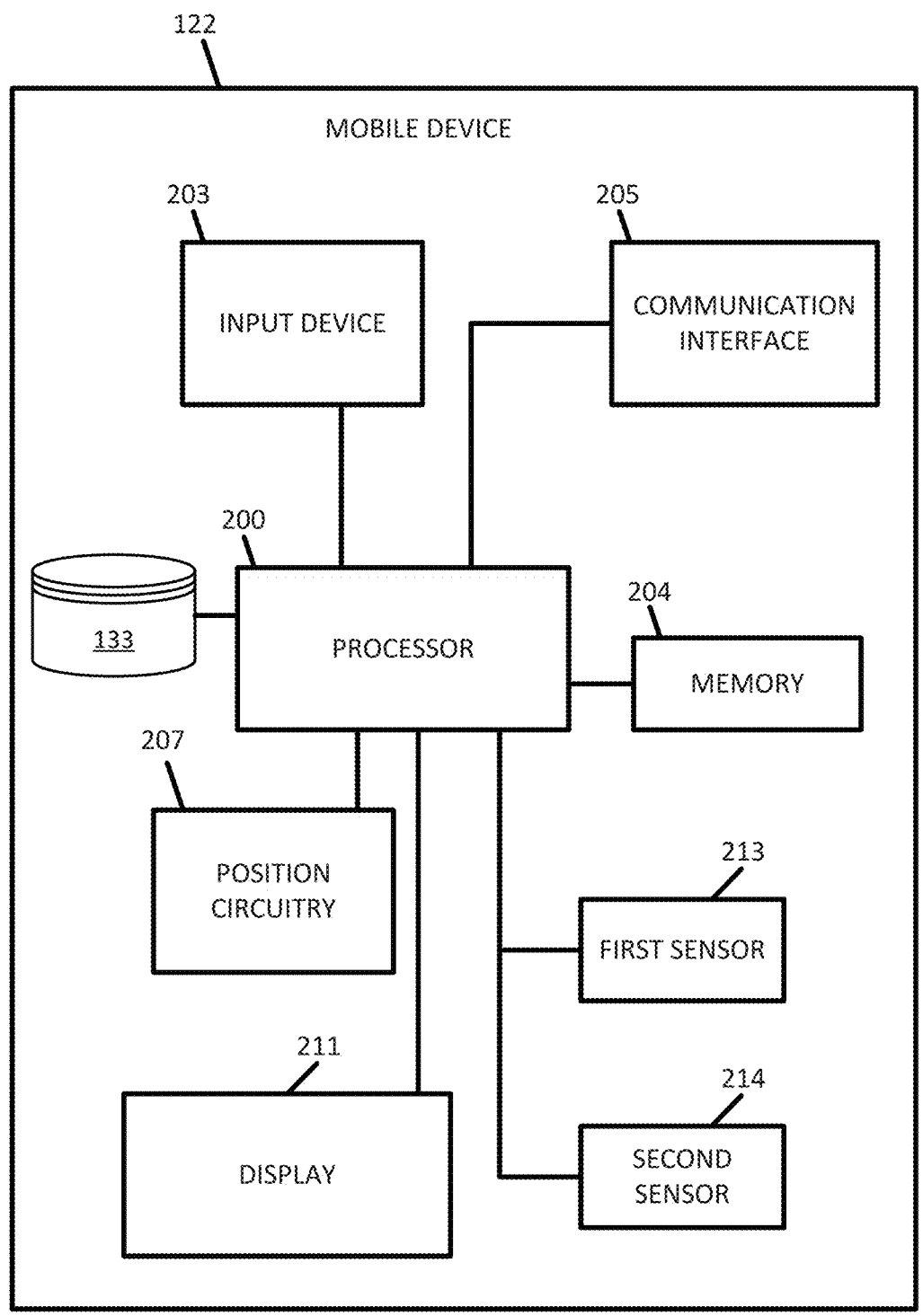
FIG. 9 illustrates an example mobile device.
Figure 10:
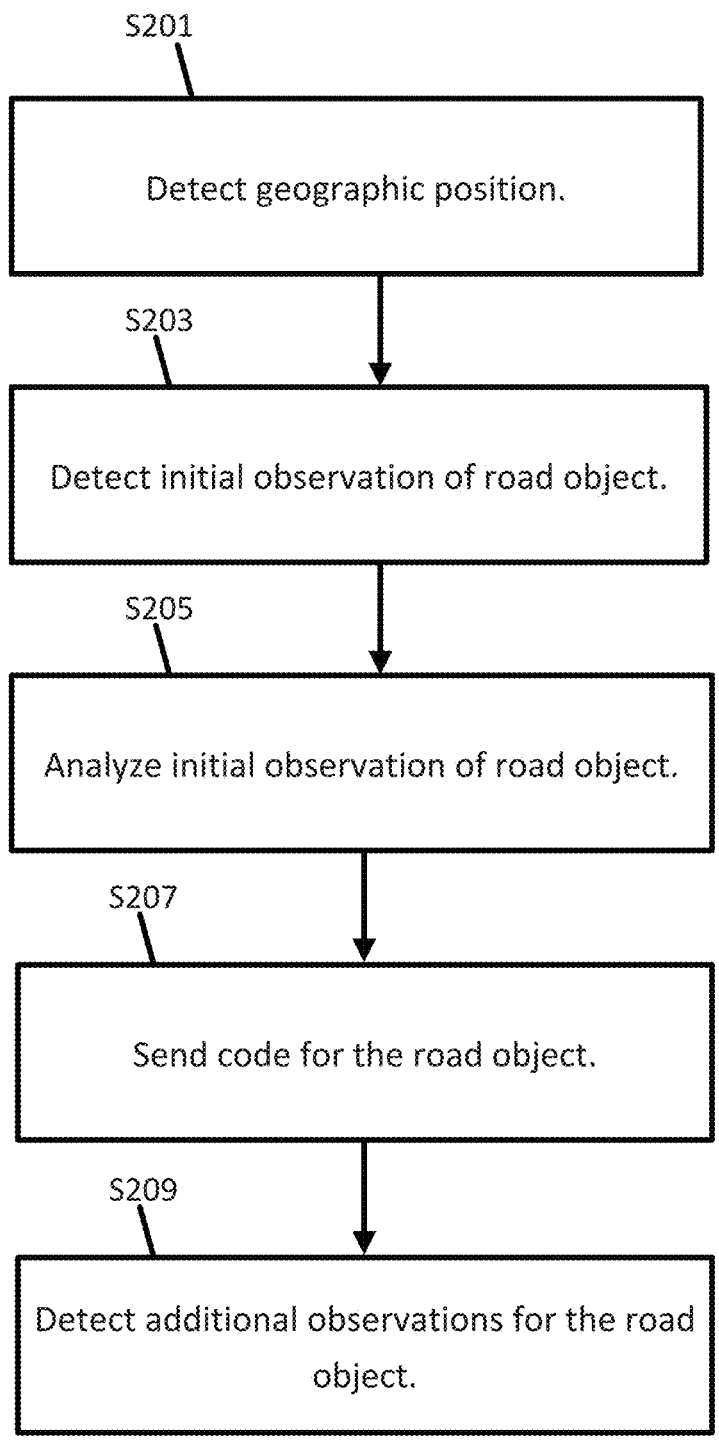
FIG. 10 illustrates an example flowchart for the mobile device of FIG. 9.

FIG. 9 illustrates an exemplary mobile device 122 of the system of FIG. 1. The mobile device 122 includes a processor 200, a vehicle database 133, a memory 204, an input device 203, a communication interface 205, position circuitry 207, a display 211, a first sensor 213, and a second sensor 214. The input device 203 may receive settings to enable or disable the mobile device for collecting observations. Additional, different, or fewer components are possible for the mobile device 122. FIG. 10 illustrates an example flowchart for the mobile device of FIG. 9. Additional, different, or fewer steps may be included.

At act S201, the position circuitry 207 detects the position of the mobile device 122, and the processor 200 receives position data from the position circuitry 207. The position data may be measured in map agnostic coordinates (e.g., longitude and latitude). The position data may include map dependent coordinates (e.g., based on a relative position in a map tile). The position data may include a height value.

At act S203, the processor 200 detects initial observation data for the road scene or road object rom the first sensor 213. The processor 200 may first receive a request from the server 125 to make the initial observation. The initial observation data may be temporarily stored in memory 204 or more permanently logged in memory 204. In some instances, the initial observation data is stored in memory 204 until a data connection to the server 125 is established, which may depend on geographic area for cell coverage or wireless network availability.

At act S205, the processor 200 performs an analysis of the initial observation data. The analysis may involve processing the initial observation data to calculate a code or identification value (ID value) for a road object in the observation data. In some instances, the analysis may include filtering the observation data to determining whether or not a road object has been detected. In some instances, the analysis may include image processing or depth map processing to determine the size, shape, and position of the road object. The analysis may include detection techniques on the image to determine symbols or words on the road object.

At act S207, the processor 200 or the communication interface 205 sends the code or ID value for the road object and the geographic position to the server 125. As described in the examples herein, a bounding box for additional observations is defined from the geographic position of the first mobile device and the analysis of the initial observation data.

At act S209, one or more subsequent observations are made based on the bounding box. Subsequent observations may be performed by the second sensor 214 or by one or more other mobile devices or vehicles. The processor 200, or similar hardware in other mobile device or vehicles, receives a request for additional observations from the serve 125. The request for additional observations may be presented by display 211. The second sensor 214 performs or detects the additional observation of data.

The mobile device 122 may generate a routing instruction based on the vehicle database 133. The routing instructions may be provided by display 211. The mobile device 122 may be configured to execute routing algorithms to determine an optimum route to travel along a road network from an origin location to a destination location in a geographic region. Using input(s) including map matching values from the server 125, a mobile device 122 examines potential routes between the origin location and the destination location to determine the optimum route. The mobile device 122, which may be referred to as a navigation device, may then provide the end user with information about the optimum route in the form of guidance that identifies the maneuvers required to be taken by the end user to travel from the origin to the destination location. Some mobile device 122 show detailed maps on displays outlining the route, the types of maneuvers to be taken at various locations along the route, locations of certain types of features, and so on. Possible routes may be calculated based on a Dijkstra method, an A-star algorithm or search, and/or other route exploration or calculation algorithms that may be modified to take into consideration assigned cost values of the underlying road segments.

The mobile device 122 may plan a route through a road system, or modify a current route through a road system in response to the request for additional observations of the road object. For example, when the mobile device 122 determines that there are two or more alternatives for the optimum route and one of the routes passes the initial observation point, the mobile device 122 selects the alternative that passes the initial observation point. The mobile devices 122 may compare the optimal route to the closest route that passes the initial observation point. In response, the mobile device 122 may modify the optimal route to pass the initial observation point.

The mobile device 122 may also report the route to the server 125. Thus, the server 125 may examine future routes of multiple mobile devices 122 and select mobile devices 122 associated with routes that pass by or nearby the initial observation point. The requests for additional observations may be distributed by the server 125 based on current routes received from mobile devices 122. When the mobile device 122 is already on the route past the initial observation point, the request for additional observation may omit the collection flag and/or the time to live value. The input device 203 may receive settings to enable or disable the mobile device 122 for receiving route alternations for the purpose of collection observation data or a maximum route deviation that is permissible for collecting observation data.

The mobile device 122 may be integrated in the vehicle 124, which may include assisted driving vehicles such as autonomous vehicles, highly assisted driving (HAD), and advanced driving assistance systems (ADAS). Any of these assisted driving systems may be incorporated into mobile device 122. Alternatively, an assisted driving device may be included in the vehicle. The assisted driving device may include memory, a processor, and systems to communicate with the mobile device 122. The assisted driving vehicles may response to geographic data received from geographic database 123 and the server 125, which may have been updated according to the collection of data in the embodiments described herein.

The term autonomous vehicle may refer to a self-driving or driverless mode in which no passengers are required to be on board to operate the vehicle. An autonomous vehicle may be referred to as a robot vehicle or an automated vehicle. The autonomous vehicle may include passengers, but no driver is necessary. These autonomous vehicles may park themselves or move cargo between locations without a human operator. Autonomous vehicles may include multiple modes and transition between the modes. The autonomous vehicle may steer, brake, or accelerate the vehicle based on the position of the vehicle in order to pass the initial observation location or road object in response to the request for additional observations.

A highly assisted driving (HAD) vehicle may refer to a vehicle that does not completely replace the human operator. Instead, in a highly assisted driving mode, the vehicle may perform some driving functions and the human operator may perform some driving functions. Vehicles may also be driven in a manual mode in which the human operator exercises a degree of control over the movement of the vehicle. The vehicles may also include a completely driverless mode. Other levels of automation are possible. The HAD vehicle may control the vehicle through steering or braking in response to the on the position of the vehicle and the request for additional observations for the road object.

Similarly, ADAS vehicles include one or more partially automated systems in which the vehicle alerts the driver. The features are designed to avoid collisions automatically. Features may include adaptive cruise control, automate braking, or steering adjustments to keep the driver in the correct lane. ADAS vehicles may issue warnings for the driver based on the position of the vehicle.

Figure 11:
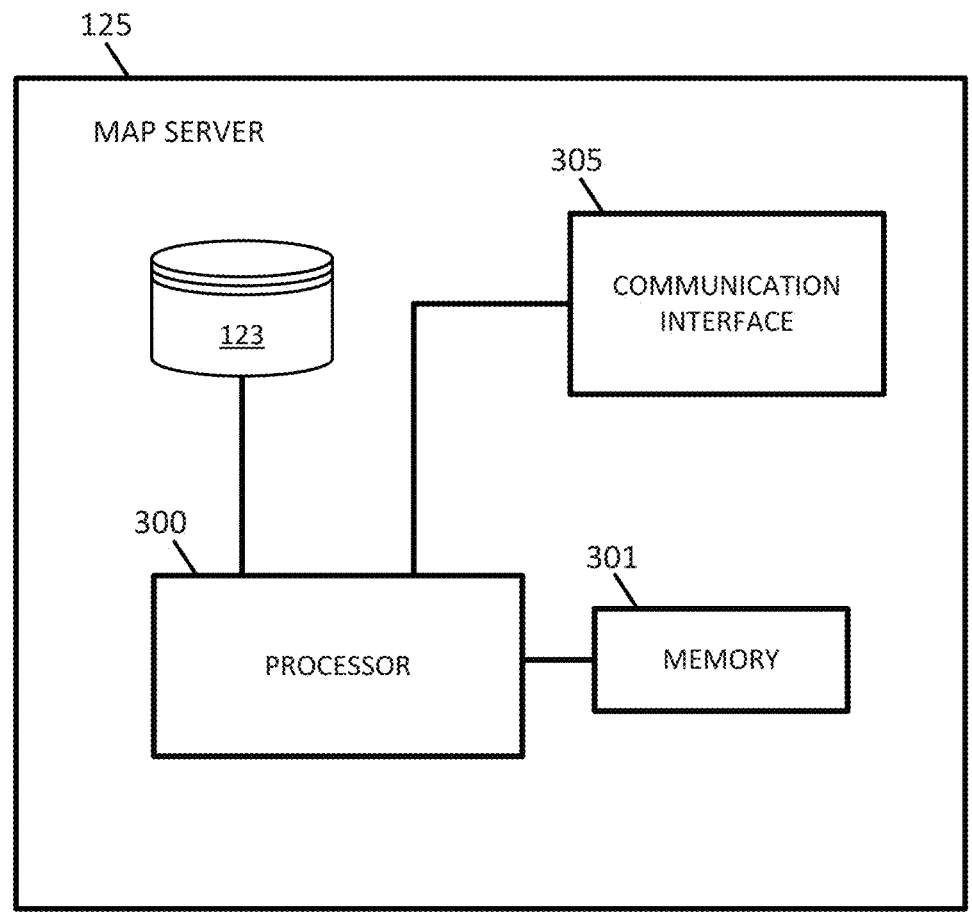
FIG. 11 illustrates an example map server.
Figure 12:
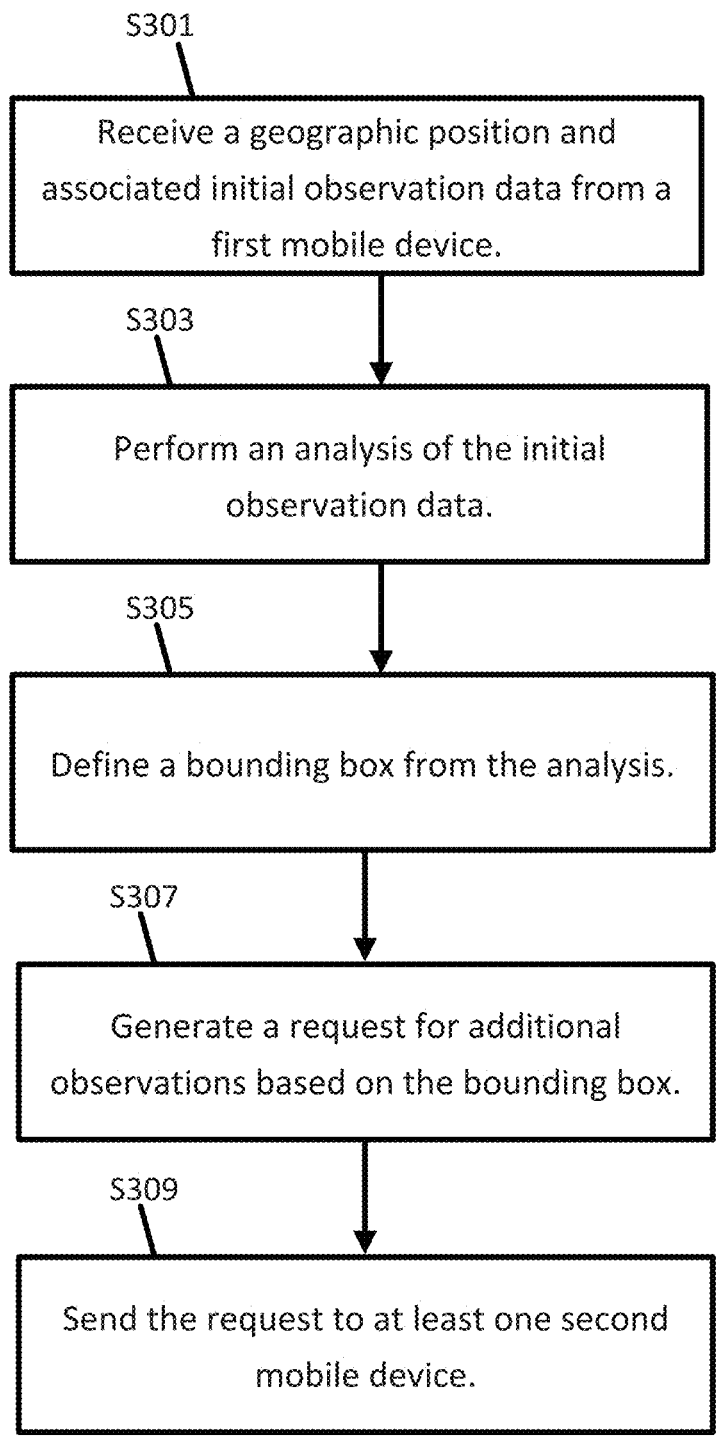
FIG. 12 illustrates an example for the map server of FIG. 11.

FIG. 11 illustrates an example server 125, which may apply to the system of FIG. 1. The server 125 includes a processor 300, a communication interface 305, a memory 301, and a database 123. An input device (e.g., keyboard or personal computer) may be used to enter settings to the server 125. Additional, different, or fewer components may be provided in the server 125. FIG. 12 illustrates an example flowchart for the operation of server 125. Additional, different, or fewer acts may be provided.

At act S301, the processor 300 or the communication interface 305 receives a geographic position and associated initial observation data from a first mobile device.

At act S303, the processor 300 performs an analysis of the initial observation data. The analysis by the processor 300 may be in addition to the analysis performed at the mobile device 122. For example, the analysis at the mobile device 122 may determine whether a road object exists or the type of road object. The analysis at act S303 may determine whether or not the road object is already included in the geographic database 123.

At act S305, the processor 300 determines or calculates a bounding box or associated road segment from the geographic position of the first mobile device and the analysis of the initial observation data. The bounding box may be sized according to any combination of the techniques described herein.

At act S307, the processor 300 generates a request for additional observations based on the bounding box or the road segment. At least one second mobile device is select from the bounding box or the geographic position associated with the initial observation data. The at least one second mobile device may be a vehicle, or carried in a vehicle, that is approaching the bounding box or the road segment. The selected mobile devices may depend on the current travel direction or anticipate travel direction of the mobile device. The processor 300 may receive a current travel direction of the mobile device and determine whether the at least one second mobile device is associated with the geographic position of the first mobile device based on the current travel direction.

The selected mobile devices may depend on the hardware capabilities of potential mobile device in the area of the bounding box. The processor 300 may receive data indicative of hardware capabilities for the at least one second mobile device and perform a comparison of the hardware capabilities to a hardware capabilities threshold. The capabilities threshold may specify a resolution or distance range that the sensor of the mobile device that is capable of observing the road object sufficiently to update the geographic database. The capabilities threshold may specify as type of sensor such as LiDAR, SONAR), RADAR or a high definition camera.

At act S309, the processor 300 or communication interface 305 sends the request for additional observations to the at least one second mobile device associated with the approaching vehicle. In response the processor 300 or the communication interface 305 receives receiving additional observations from the at least one second mobile device and updates the geographic database based on the additional observations.

The controller 200 and/or processor 300 may include a general processor, digital signal processor, an application specific integrated circuit (ASIC), field programmable gate array (FPGA), analog circuit, digital circuit, combinations thereof, or other now known or later developed processor. The controller 200 and/or processor 800 may be a single device or combinations of devices, such as associated with a network, distributed processing, or cloud computing.

The memory 204 and/or memory 301 may be a volatile memory or a non-volatile memory. The memory 204 and/or memory 301 may include one or more of a read only memory (ROM), random access memory (RAM), a flash memory, an electronic erasable program read only memory (EEPROM), or other type of memory. The memory 204 and/or memory 801 may be removable from the mobile device 122, such as a secure digital (SD) memory card.

The communication interface 205 and/or communication interface 305 may include any operable connection. An operable connection may be one in which signals, physical communications, and/or logical communications may be sent and/or received. An operable connection may include a physical interface, an electrical interface, and/or a data interface. The communication interface 205 and/or communication interface 305 provides for wireless and/or wired communications in any now known or later developed format.

The databases 123 and 133 may include geographic data used for traffic and/or navigation-related applications. The geographic data may include data representing a road network or system including road segment data and node data. The road segment data represent roads, and the node data represent the ends or intersections of the roads. The road segment data and the node data indicate the location of the roads and intersections as well as various attributes of the roads and intersections. Other formats than road segments and nodes may be used for the geographic data. The geographic data may include structured cartographic data or pedestrian routes.

The databases may also include other attributes of or about the roads such as, for example, geographic coordinates, street names, address ranges, speed limits, turn restrictions at intersections, and/or other navigation related attributes (e.g., one or more of the road segments is part of a highway or toll way, the location of stop signs and/or stoplights along the road segments), as well as points of interest (POIs), such as gasoline stations, hotels, restaurants, museums, stadiums, offices, automobile dealerships, auto repair shops, buildings, stores, parks, etc. The databases may also contain one or more node data record(s) which may be associated with attributes (e.g., about the intersections) such as, for example, geographic coordinates, street names, address ranges, speed limits, turn restrictions at intersections, and other navigation related attributes, as well as POIs such as, for example, gasoline stations, hotels, restaurants, museums, stadiums, offices, automobile dealerships, auto repair shops, buildings, stores, parks, etc. The geographic data may additionally or alternatively include other data records such as, for example, POI data records, topographical data records, cartographic data records, routing data, and maneuver data.

The databases may include historical traffic speed data for one or more road segments. The databases may also include traffic attributes for one or more road segments. A traffic attribute may indicate that a road segment has a high probability of traffic congestion.

The input device 203 may be one or more buttons, keypad, keyboard, mouse, stylus pen, trackball, rocker switch, touch pad, voice recognition circuit, or other device or component for inputting data to the mobile device 122. The input device 203 and display 211 may be combined as a touch screen, which may be capacitive or resistive. The display 211 may be a liquid crystal display (LCD) panel, light emitting diode (LED) screen, thin film transistor screen, or another type of display. The output interface 211 may also include audio capabilities, or speakers. In an embodiment, the input device 203 may involve a device having velocity detecting abilities.

The positioning circuitry 207 may include suitable sensing devices that measure the traveling distance, speed, direction, and so on, of the mobile device 122. The positioning system may also include a receiver and correlation chip to obtain a GPS signal. Alternatively or additionally, the one or more detectors or sensors may include an accelerometer and/or a magnetic sensor built or embedded into or within the interior of the mobile device 122. The accelerometer is operable to detect, recognize, or measure the rate of change of translational and/or rotational movement of the mobile device 122. The magnetic sensor, or a compass, is configured to generate data indicative of a heading of the mobile device 122. Data from the accelerometer and the magnetic sensor may indicate orientation of the mobile device 122. The mobile device 122 receives location data from the positioning system. The location data indicates the location of the mobile device 122.

The positioning circuitry 207 may include a Global Positioning System (GPS), Global Navigation Satellite System (GLONASS), or a cellular or similar position sensor for providing location data. The positioning system may utilize GPS-type technology, a dead reckoning-type system, cellular location, or combinations of these or other systems. The positioning circuitry 207 may include suitable sensing devices that measure the traveling distance, speed, direction, and so on, of the mobile device 122. The positioning system may also include a receiver and correlation chip to obtain a GPS signal. The mobile device 122 receives location data from the positioning system. The location data indicates the location of the mobile device 122.

The position circuitry 207 may also include gyroscopes, accelerometers, magnetometers, or any other device for tracking or determining movement of a mobile device. The gyroscope is operable to detect, recognize, or measure the current orientation, or changes in orientation, of a mobile device. Gyroscope orientation change detection may operate as a measure of yaw, pitch, or roll of the mobile device.

The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory.

Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry. In an embodiment, a vehicle may be considered a mobile device, or the mobile device may be integrated into a vehicle.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored. These examples may be collectively referred to as a non-transitory computer readable medium.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. A method comprising:
   detecting, by position circuitry, a geographic position of a first mobile device;
   detecting initial observation data from a first sensor;
   performing an analysis of the initial observation data, wherein the analysis includes identification of a code for a road object;
   sending the code for the road object and the geographic position to a server, wherein a bounding box or a road segment is defined from the geographic position of the first mobile device and the analysis of the initial observation data;
   receiving a request for additional observations of the road object from the server, wherein the request is one of a plurality of requests sent by the server in response to the bounding box or the road segment defined from the geographic position of the first mobile device and the analysis of the initial observation data; and
   setting a collection flag in response to the request for additional observations of the road object, wherein the collection flag is configured to be deleted in response to time, distance, or collection fulfillment by a second mobile device.

2. The method of claim 1, wherein the first sensor is a first camera.

3. The method of claim 2, wherein a second sensor associated with the second mobile device includes light detection and ranging (LiDAR), sound navigation and ranging (SONAR), radio detection and ranging (RADAR), or a high definition camera.

4. The method of claim 1, further comprising:
   filtering the initial observation data to determining whether or not the road object has been detected.

5. The method of claim 1, further comprising:
   processing a depth map to determine the size, shape, or position of the road object.

6. The method of claim 1, further comprising:
   processing a depth map to identify symbols or words on the road object.

7. The method of claim 1, further comprising:
   receiving additional observations collected by the second mobile device.

8. The method of claim 1, further comprising:
   generating a routing instruction based, at least in part, on the additional observations collected by the second mobile device.

9. The method of claim 1, further comprising:
   executing a routing algorithm based, at least in part, on the additional observations collected by the second mobile device.

10. An apparatus comprising:
    position circuitry configured to detect a geographic position of a mobile device;
    a sensor configured to detect initial observation data;
    a controller configured to perform an analysis of the initial observation data; and
    a communication interface configured to send the code for a road object and the geographic position to a server,
    wherein a bounding box for the road object is defined from the geographic position of the mobile device and the analysis of the initial observation data,
    wherein the controller is configured to set a collection flag in response to a request for additional observations of the road object received at the communication interface from the server, wherein the request is one of a plurality of requests sent by the server in response to the bounding box defined from the geographic position of the mobile device and the analysis of the initial observation data, wherein the collection flag is configured to be deleted in response to time, distance, or collection fulfillment by another mobile device.

11. The apparatus of claim 10, wherein the additional observations are collected by light detection and ranging (LiDAR), sound navigation and ranging (SONAR), radio detection and ranging (RADAR), or a high definition camera.

12. The apparatus of claim 10, wherein the controller is configured to filter the initial observation data to determining whether or not the road object has been detected.

13. The apparatus of claim 10, wherein the controller is configured to process a depth map to determine the size, shape, or position of the road object.

14. The apparatus of claim 10, wherein the controller is configured to process a depth map to identify symbols or words on the road object.

15. The apparatus of claim 10, wherein the communication interface receives additional observations collected by another mobile device.

16. The apparatus of claim 15, further comprising:
    generating a routing instruction based, at least in part, on the additional observations collected by the other mobile device.

17. The apparatus of claim 10, wherein the bounding box is variable according to traffic, direction of travel, a number of vehicles, or a concentration of vehicles.

18. A non-transitory computer readable medium including instructions configured to cause a processor to perform:
    identifying a geographic position of a first mobile device;
    identifying initial observation data collected by a first sensor;
    performing an analysis of the initial observation data, wherein the analysis includes identification of a code for a road object;
    sending the code for the road object and the geographic position to a server, wherein a bounding box or a road segment is defined from the geographic position of the first mobile device and the analysis of the initial observation data;

receiving a request for additional observations for the road object from the server, wherein the request is one of a plurality of requests sent by the server in response to the bounding box or the road segment defined from the geographic position of the first mobile device and the analysis of the initial observation data; and setting a collection flag in response to the request for the road object, wherein the collection flag is configured to be deleted in response to time, distance, or collection fulfillment by a second mobile device.

* * * * *